United States Patent
Tuin et al.

(10) Patent No.: US 7,140,895 B2
(45) Date of Patent: Nov. 28, 2006

(54) CONNECTOR FOR ELECTRONIC COMPONENTS

(75) Inventors: Jacobus Nicolaas Tuin, Best (NL); Peter Dirk Jaeger, Dussen (NL)

(73) Assignee: Tyco Electronics Nederland B.V., AG'S-Hertogenbosch (NL)

( * ) Notice: Subject to any disclaimer, the term of this patent is extended or adjusted under 35 U.S.C. 154(b) by 0 days.

(21) Appl. No.: 11/172,577

(22) Filed: Jun. 30, 2005

(65) Prior Publication Data

US 2006/0030191 A1   Feb. 9, 2006

(30) Foreign Application Priority Data

Jun. 30, 2004   (EP) .................... 04103094

(51) Int. Cl.
*H01R 4/56* (2006.01)
(52) U.S. Cl. ..................... 439/246
(58) Field of Classification Search ....... 439/246–248, 439/850
See application file for complete search history.

(56) References Cited

U.S. PATENT DOCUMENTS

| | | | |
|---|---|---|---|
| 1,880,511 A | 10/1932 | Soreny | |
| 2,870,424 A | 1/1959 | Franz | |
| 3,233,208 A | 2/1966 | Ruehlemann et al. | |
| 4,738,631 A * | 4/1988 | Takahashi et al. | 438/248 |
| 4,778,404 A * | 10/1988 | Pass | 438/387 |
| 4,810,215 A * | 3/1989 | Kaneko | 439/845 |
| 4,998,890 A | 3/1991 | Tuan | 439/326 |
| 5,112,235 A * | 5/1992 | Enomoto et al. | 439/83 |
| 5,201,663 A * | 4/1993 | Kikuchi et al. | 439/83 |
| 5,306,168 A * | 4/1994 | Kunishi et al. | 439/248 |
| 5,306,169 A * | 4/1994 | Fukushima et al. | 438/248 |
| 5,679,010 A * | 10/1997 | Hotea et al. | 439/81 |
| 5,951,314 A | 9/1999 | Durand-Cochet et al. | |
| 6,033,245 A * | 3/2000 | Yamkovoy | 439/246 |
| 6,171,138 B1 | 1/2001 | Lefebvre et al. | 439/500 |
| 6,511,336 B1 * | 1/2003 | Turek et al. | 439/249 |
| 6,908,326 B1 * | 6/2005 | Shiota et al. | 438/247 |
| 2004/0002265 A1 | 1/2004 | Shimizu et al. | 439/660 |

FOREIGN PATENT DOCUMENTS

DE   196 00 189 A1   7/1997
EP   1 202 401 A   5/2002

OTHER PUBLICATIONS

European Search Report dated Oct. 26, 2005 for application No. EP 05 10 5732.

* cited by examiner

*Primary Examiner*—Gary F. Paumen
(74) *Attorney, Agent, or Firm*—Barley Snyder LLC

(57) ABSTRACT

A receptacle connector comprises at least one receptacle contact. The receptacle contact includes a contact member and at least one spring member. The contact member is formed for receipt of a plug contact along a mating plane. The contact member is resiliently displaceable in a direction substantial lateral to the mating plane by the spring member.

10 Claims, 9 Drawing Sheets

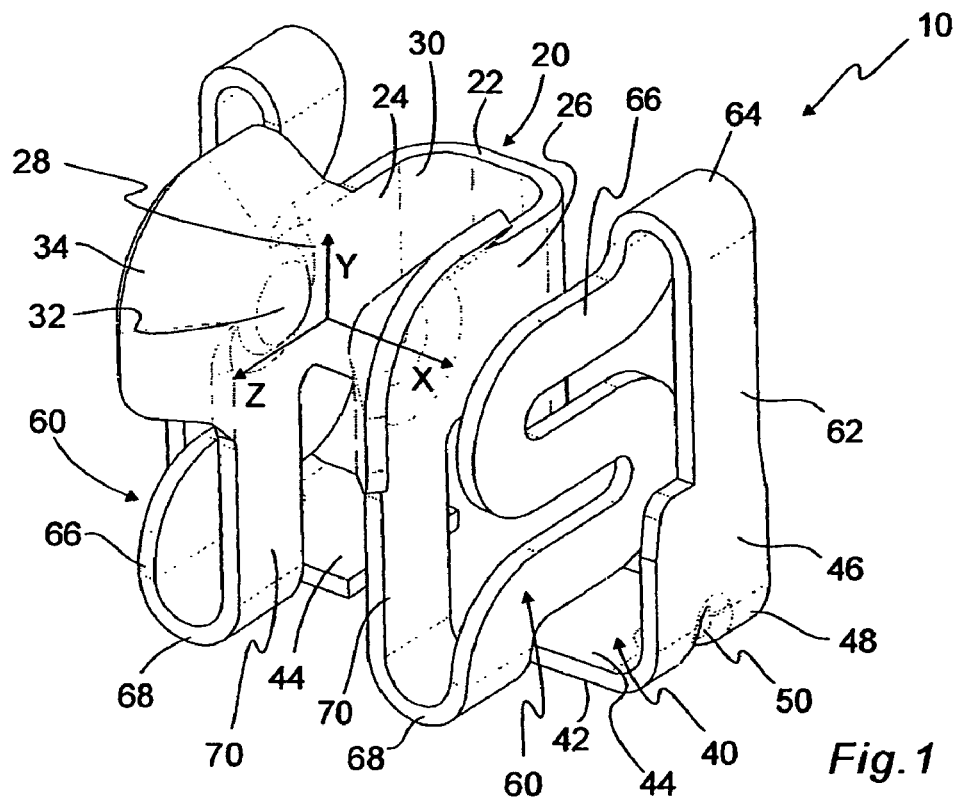
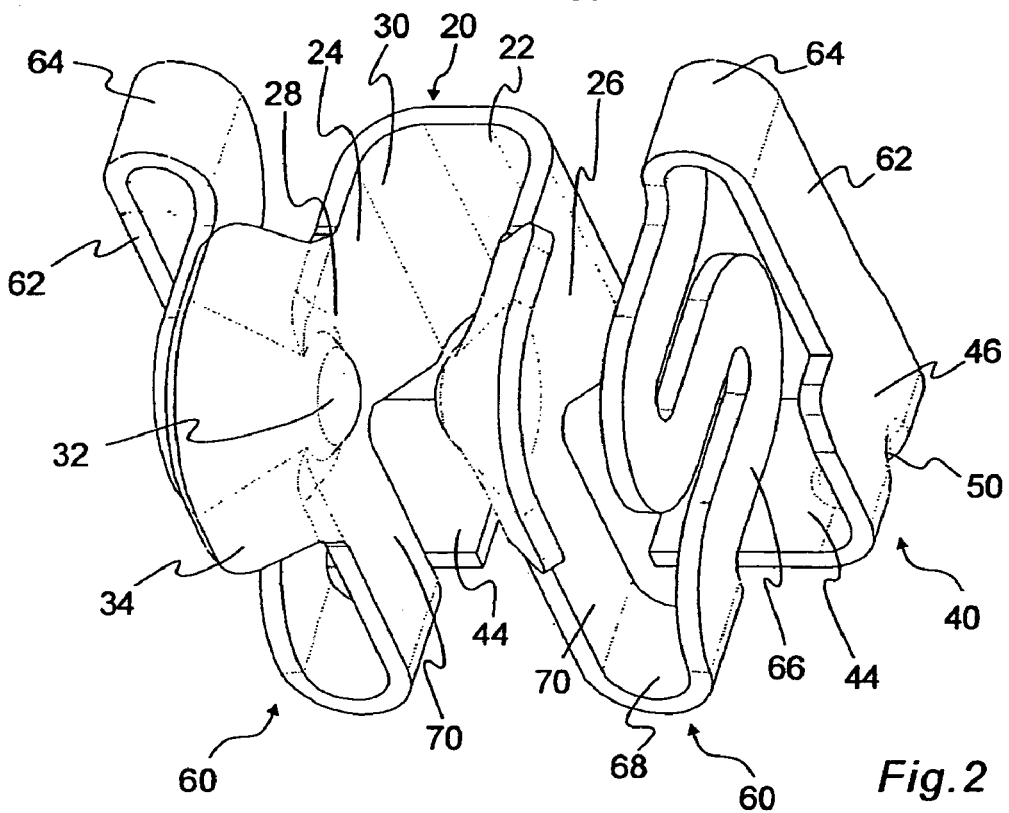

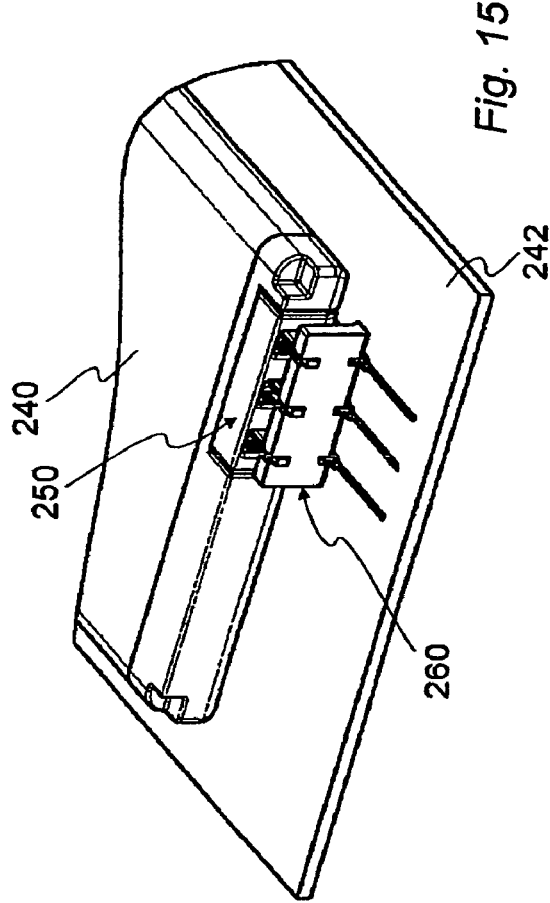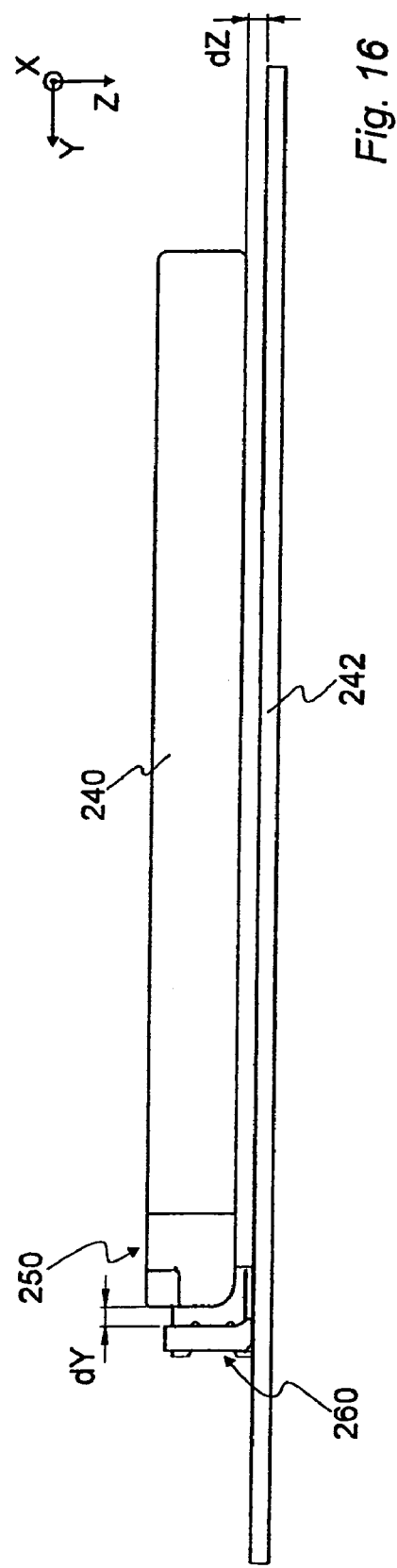

CONNECTOR FOR ELECTRONIC COMPONENTS

FIELD OF THE INVENTION

The invention relates to connectors and, more particularly, to a receptacle connector having a receptacle contact having a contact member that is resiliently displaceable in a direction substantially lateral to a mating plane.

BACKGROUND OF THE INVENTION

Detachable electrical connectors are used to temporarily connect electronic components or accessories with electronic devices. Besides providing a low-resistance electrical connection, the electrical connectors must be mechanically stable to ensure a permanent electrical connection. The demands on the reliability of the electrical connections are of particular importance if the electronic devices are used under conditions where mechanical stress or load occurs. For such electronic devices, rugged electrical connectors are required.

A typical example of an electronic device, which may experience mechanical stress, is a mobile phone. Although specific accessories such as carrying cases are available for mobile phones to reduce the risk of mechanical stress, the mobile phone could still, for example, be accidentally dropped on a floor. The high mechanical stress of such an impact could lead to severe damage of the mobile phone.

A removable battery pack, which is detachably connected with the mobile phone, is a typical example of an electronic component. An example of such a battery pack is disclosed in U.S. Pat. No. 6,171,138 B1. This battery pack comprises an electrical connector assembly having a latch and a U-shaped contact housing. The contact housing accommodates a plurality of stacked electrical contacts. The latch, which is partially surrounded by the contact housing, engages with a housing of a mobile phone to fasten a battery cover. Each of the stacked electrical contacts comprises a non-compliant portion, which is fixed to the contact housing, and a compliant portion having a contact portion for contacting corresponding receptacle contacts of a receptacle connector fixed to the mobile phone. At the non-compliant portion, contact attachment tabs are provided, which are inserted into corresponding contact alignment slots of the contact housing. For further alignment, alignment slots are provided in walls of the contact housing. The compliant portions of the electrical contacts extend through the alignment slots so that the contact portions of the electrical contacts are exposed on an outside of the contact housing. When the battery cover is attached to the mobile phone, the contact portions are resiliently pressed against the receptacle contacts by the compliant portions of the stacked electrical contacts.

Another example of an electrical connector assembly for a battery pack of a mobile phone is disclosed in U.S. Patent Application Publication No. 2004/0002265 A1. This assembly comprises a base connector and a socket connector. The base connector is fixed onto a mounting surface by soldering. The socket connector is inserted into an insertion space of the base connector along a mating direction, which is substantially perpendicular to the mounting surface. Plate-like contacts are arranged in the insertion space and extend substantially parallel to each other. The plate-like contacts are contacted by contacts of the socket connector. Each of contacts includes a pair of contact pieces extending substantially parallel to each other. Each of the contact pieces is provided with a contact portion. The contact portions project toward each other and engage with side walls of the plate-like contacts of the base connector. The socket connector is further connected to a conductor, which generally extends parallel to the mounting surface of the base connector when the socket connector is inserted. The socket connector and the base connector further comprise cam surfaces angled with respect to the mounting surface of the base connector to convert tensions exerted on the socket connector into a substantially perpendicularly orientated force. As a consequence, when pulling on the leads, the engaging cam surfaces redirect the acting forces into extracting forces substantially perpendicular to the mounting surface to unplug the socket connector. Shear stresses within the solder joints between the base connector and the mounting surface are thereby partially reduced.

Mechanical strains of an electrical connection can also occur within stationary electronic devices and efforts have been made to compensate for the mechanical strains and to improve the reliability of the electrical connection. Stress compensation is of particular importance when the electrical contacts of the connectors are directly soldered to a printed circuit board. A contact element with improved stress-compensation is, for example, disclosed in U.S. Pat. No. 4,998,890. This contact element is used as an electrical connector for connecting a daughter board to a mother board. When soldered to a printed circuit board, the contact element extends substantially perpendicular to a main surface of the printed circuit board. The contact element comprises a base portion and first and second spring contact portions, which are supported by resilient supporting arm members integrally attached to the base portion and the spring contact portions. The first and second spring contact portions contact each other on a boundary separating line along which the spring contacts portions can slide with respect to each other to prevent overstress when the daughter board is inserted into the contact element.

SUMMARY OF THE INVENTION

Although the connector assemblies described above address the issue of stress-compensation or stress-reduction, a need still exists for improved connectors. It is therefore an object of the invention to provide an electrical connector having improved stress-compensation, which can be easily manufactured and fixed to an electronic component.

This and other objects are achieved by a receptacle connector comprising at least one receptacle contact. The receptacle contact includes a contact member and at least one spring member. The contact member is formed for receipt of a plug contact along a mating plane. The contact member is resiliently displaceable in a direction substantial lateral to the mating plane by the spring member.

This and other objects are further achieved by a receptacle connector having at least one receptacle contact. The receptacle contact comprises a contact member and spring members. The contact member is formed for receipt of a plug contact along a mating plane. At least one spring member is arranged on each side of the contact member. The contact member is resiliently displaceable in a direction substantial lateral to the mating plane by the spring members.

BRIEF DESCRIPTION OF THE DRAWINGS

FIG. 1 is a front perspective view of a receptacle contact according to a first embodiment of the invention;

FIG. 2 is a top perspective view of the receptacle contact shown in FIG. 1;

FIG. 15 is a partial perspective view of a battery pack connected with a mobile phone;

FIG. 16 is a side view of the battery pack connected with a printed circuit board;

DETAILED DESCRIPTION OF THE INVENTION

Figure 3:
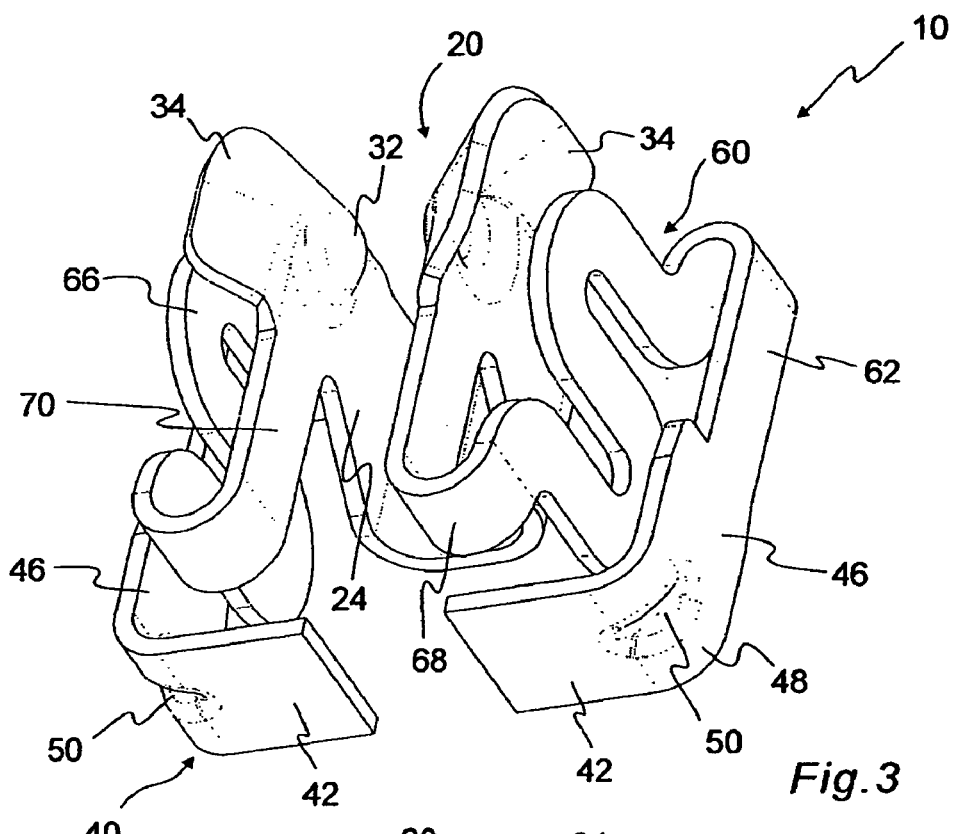
FIG. 3 is a bottom perspective view of the receptacle contact shown in FIG. 1.

FIGS. 1, 7, 14, and 16 show a Cartesian co-ordinate system comprising an X-axis, Y-axis, and Z-axis. The Cartesian co-ordinate system is used throughout the description to indicate the spatial relationships of structural features of the invention. According to the Cartesian co-ordinate system, a mating plane YZ extends in the YZ-plane, a lateral direction X is coaxial with the X-axis, and a contact surface of a base portion is in the XZ-plane. A main surface of an electronic component is in the XZ-plane. Additionally, reference to a front side refers to a side of a receptacle connector that faces a mating plug connector.

FIGS. 1–4 show a first embodiment of a receptacle contact 10. The receptacle contact 10 includes a contact member 20, a base member 40, and spring members 60. The receptacle contact 10 is integrally formed by punching a shaped metal strip out of a metal plate and subsequently bending the metal strip. The receptacle contact 10 is substantially mirror-symmetrical with respect to the mating plane YZ, which extends perpendicular to a contact surface 42 of the base member 40.

The base member 40 comprises a bottom portion 44 and a lateral portion 46, which is upwardly bent along a bending edge 48 and arranged on a lateral outer side of the receptacle contact 10. An inwardly directed central depression 50 is provided on the bending edge 48 between the bottom portion 44 and the lateral portion 46 and reinforces the base member 40. The base member 40 may comprise a soldering surface for soldering the receptacle contact 10 to the electronic component to provide a mechanical and/or electrical connection. Alternative electrical and/or mechanical connections such as connections by wires or solder legs are also possible.

At an upper end, the lateral portion 46 passes into the spring member 60. The spring member 60 comprises a first portion 62, which upwardly extends up to an upper bending edge 64, a second portion 66, which is downwardly bent on the upper bending edge 64 and extends up to a lower bending edge 68, and a third portion 70, which is upwardly bent on the lower bending edge 68. The first and third portions 62, 70 are substantially straight strips while the second portion 66 is a substantially meander-shaped strip. The first, second, and third portions 62, 66, 70 have substantially the same thickness. It will be appreciated by those skilled in the art, however, that the spring member 60, the base member 40 and/or the contact member 20 may be formed with different thicknesses or can be reinforced with additional material.

Figure 4:
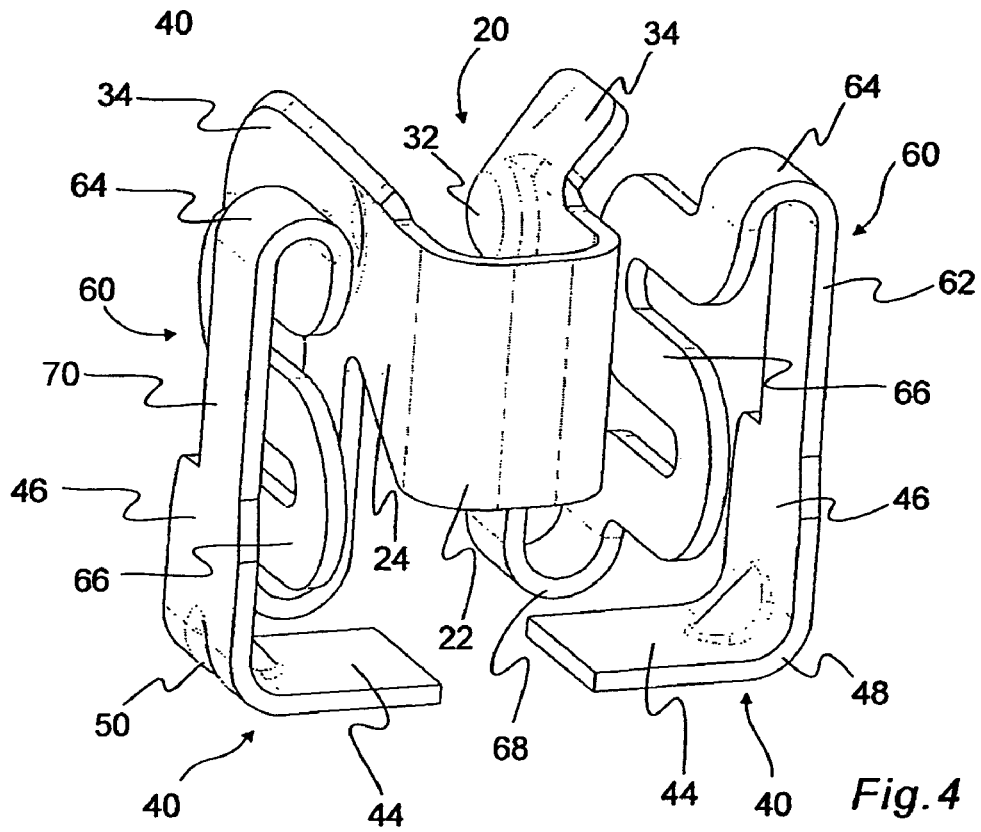
FIG. 4 is rear perspective view of the receptacle contact shown in FIG. 1.

The spring member 60 passes on an upper end of the third portion 70 into the contact member 20. The contact member 20 is substantially U-shaped and extends substantially parallel to the contact surface 42. The contact member 20 has an opening toward a front face of the receptacle connector. A connecting portion 22 that connects resilient first and second legs 24, 26 of the contact member 20 is attached to fixed ends 30 of the first and second legs 24, 26 on a backside of the receptacle contact 10. The metal strip forming the contact member 20 has a breadth (the longer sides of its rectangular cross-sectional profile) that continuously increases from free or contact ends 28 of the first and second legs 24, 26 towards the fixed ends 30 and has maximum dimensions along the extension of the connecting portion 22, as shown in FIG. 4.

The first, second, and third portions 62, 66, 70 of the spring member 60 each extend in a different plane. Each of the planes is arranged substantially parallel to the mating plane YZ. A slanted configuration, however, is also possible. The first portion 62 is arranged in an outer plane, the second portion 66 in a middle plane, and the third portion 70 in an inner plane. Further, the lateral portion 46 of the base member 40 is also arranged in the outer plane while the first and second legs 24, 26 of the contact member 20 extend in the inner plane. On the upper and lower bending edges 64, 68, the spring member 60 passes from the outer plane to the middle plane and from the middle plane to the inner plane, respectively.

At the contact ends 28, the first and second legs 24, 26 comprise inwardly directed contact points 32 that face each other. The contact points 32 may be, for example, inwardly formed conical protuberances. The contact points 32 are arranged in the lateral direction X perpendicular to the mating plane YZ so that a plug contact arranged in the mating plug connector is contacted on opposite sides. To facilitate insertion and alignment of the plug contact, guide members 34 are formed at the contact ends 28 of the first and second legs 24, 26. The guide members 34 extend along an imaginary line, which runs in a curved extension of the front edge of the third portion 70 of the spring member 60 and the upper edge of the first and second legs 24, 26, and are bent off the mating plane YZ. The brim-like or partial conical shape of inner surfaces of the guide members 34 constitute guiding surfaces along which the plug contact slides when it is being inserted into the receptacle contact 10.

Since the receptacle contact 10 of the first embodiment is substantially mirror-symmetrical with respect to the mating plane YZ, which extends substantially between the first and second legs 24, 26 of the contact member 20, the receptacle contact 10 comprises two of the base portions 40 and two of the spring members 60. Each of the spring members 60 is integrally formed with one of the base portions 40 and contacts either the first or second leg 24, 26 of the contact member 20. This configuration is easy to manufacture and assemble to an electronic component, such as a printed circuit board. Additionally, the contact member 20 is arranged substantially parallel to the contact surface 42 and extends along the Z-axis. Because the contact member 20 has a substantially U-shaped configuration, the plug contact can be inserted along the Z-axis (parallel to the contact member 20), along the Y-axis (perpendicular to the contact member 20), or at any angle lying in the YZ-plane. Moreover, it is possible to insert or swivel the plug contact along a curved line. This feature is advantageous in the case of electronic components that are to be connected with compact mobile devices where only a small amount of space is provided for linear insertion. The plug contact can be moved in the YZ-plane until it contacts the connecting portion 22 of the contact member 20 or a main surface of the electronic component. In a final insertion position, the plug contact is spaced apart from both the connecting portion 22 and the main surface of the electrical component.

A displacement of the plug contact only slightly affects the receptacle contact 10, since the plug contact is able to freely move relative to the contact member 20 in the YZ-plane. Frictional forces between the plug contact and the contact member 20, which originate from the engagement of the contact points 32 with the plug contact, are typically not strong enough to inhibit such a displacement. The spring members 60, which are flexible in the Y-direction and Z-direction also partially compensate for such a displacement. On the other hand, a displacement in the X-direction is compensated for by the spring members 60 while maintaining permanent contact between the plug contact and the contact member 20.

The spring members 60 mechanically decouple the contact member 20 from the electronic component to a great extent and hence reduce mechanical stress when the contact member 20 is displaced due to external forces. Hence, a permanent electrical connection is ensured regardless of displacement of the contact member 20. Preferably, the spring members 60 enable displacement of the whole contact member 20 with respect to the base member 40 which means that a physical connection between the contact member 20 and the base member 40 is preferably provided only by the spring members 60. The spring members 60 decouple the contact member 20 from the base member 40 to prevent or reduce a transmission of stress from the contact member 20 to the base member 40.

The spring members 60 have a main direction of elasticity in the X-direction due to their structure and cross-sectional profile. The spring members 60 show a certain but substantially lower elasticity in the Z-direction and the Y-direction than in the X-direction. The rectangular cross-sectional profile of the spring members 60, the longer side of which extends in the YZ-plane and therefore perpendicular to the X-direction, and the substantially meander-shaped second portions 66 substantially define the elasticity. Because the substantially meander-shape of the second portions 66 extends over the overall length of the spring member 60, the second portions 66 are capable of having elasticity while still being compactly formed.

The first and second legs 24, 26 constitute spring elements, which have a main direction of elasticity coaxial with the X-axis and hence the main direction of elasticity of the spring members 60. The first and second legs 24, 26 have virtually no elasticity in the Y-direction and the Z-direction. The continuous increase of the cross-sectional profile of the first and second legs 24, 26 towards the fixed ends 30 provides spring elements having a high spring constant in the X-direction to ensure that the contact points 32 are firmly pressed against the plug contact. To maintain permanent contact, the spring constant of the first and second legs 24, 26 is substantially higher than the spring constant of the spring members 60 in the X-direction. Upon action of an external force on the plug contact or on the receptacle contact 10 in the lateral direction X, no or only a slight bending of the first and second legs 24, 26 occurs while the more resilient spring members 60 enable a lateral displacement of the entire contact member 20. The plug contact therefore remains firmly contacted by the contact member 20 even in the event of strong displacements or impact loading because the contact member 20 can follow the lateral displacement of the plug contact.

Forces or tensions, which occur upon lateral displacement of the plug contact, are compensated or adsorbed by the spring members 60 so that little or no tilting forces act on the receptacle contact 10 or the base member 40. The mechanical stress exerted on the joint between the base member 40 and the electrical component is hence reduced, which is particularly important for soldered joints. Therefore, the inventive receptacle connector with the receptacle contact 10 is particularly suitable for being directly soldered to the printed circuit board.

Typically, a spring is designed to have a direction of main elasticity. For instance, the main direction of elasticity of a helical spring is coaxial with its axial extension. On the other hand, a flat spring is most resilient perpendicular to its extension. When talking about lateral displacement of the contact member 20 enabled by the spring members 60, it is meant that the spring members 60 preferably has its main direction of elasticity in the lateral direction X. However, it will be evident to those skilled in the art that the spring members 60 can also be partially or fully resilient in a direction different from the direction of main elasticity and therefore may enable a certain resilient displacement in further directions. The desired elasticity of the spring members 60 and the first and second legs 24, 25 can be adjusted by changing the cross-sectional profile and/or by adjusting the length of the first and second legs 24, 25. In particular, the folding structure and the substantially meander-shape of the spring members 60 substantially increases the overall length of the spring members 60 and hence improves flexibility.

It will be evident to those skilled in the art that the lateral displacement of the plug contact with respect to the receptacle contact 10 includes both a displacement of the plug connector with respect to a fixed receptacle connector as well as a displacement of the receptacle connector relative to a fixed plug connector. Therefore, a displacement of the plug contact generally refers to any movement of these elements relative to each other.

Figure 5:
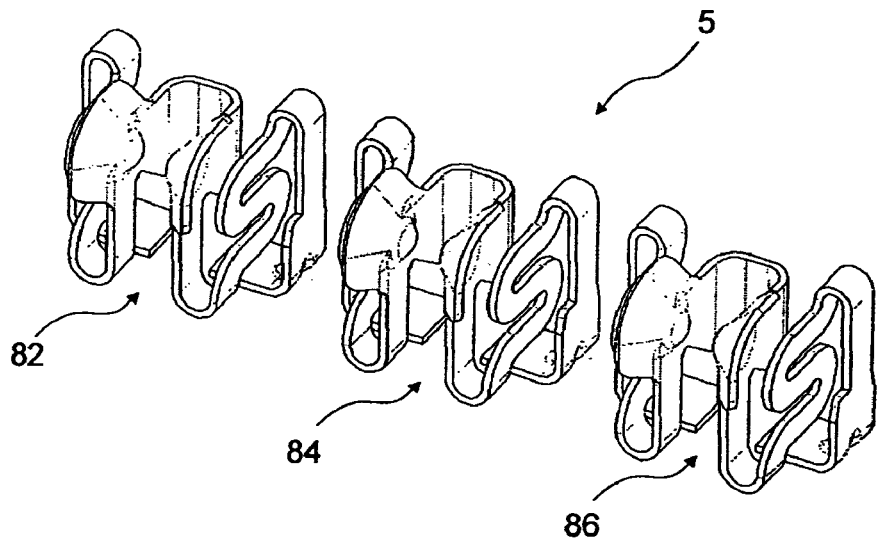
FIG. 5 is a front perspective view of a receptacle connector according to the first embodiment of the invention shown without a housing.
Figure 6:
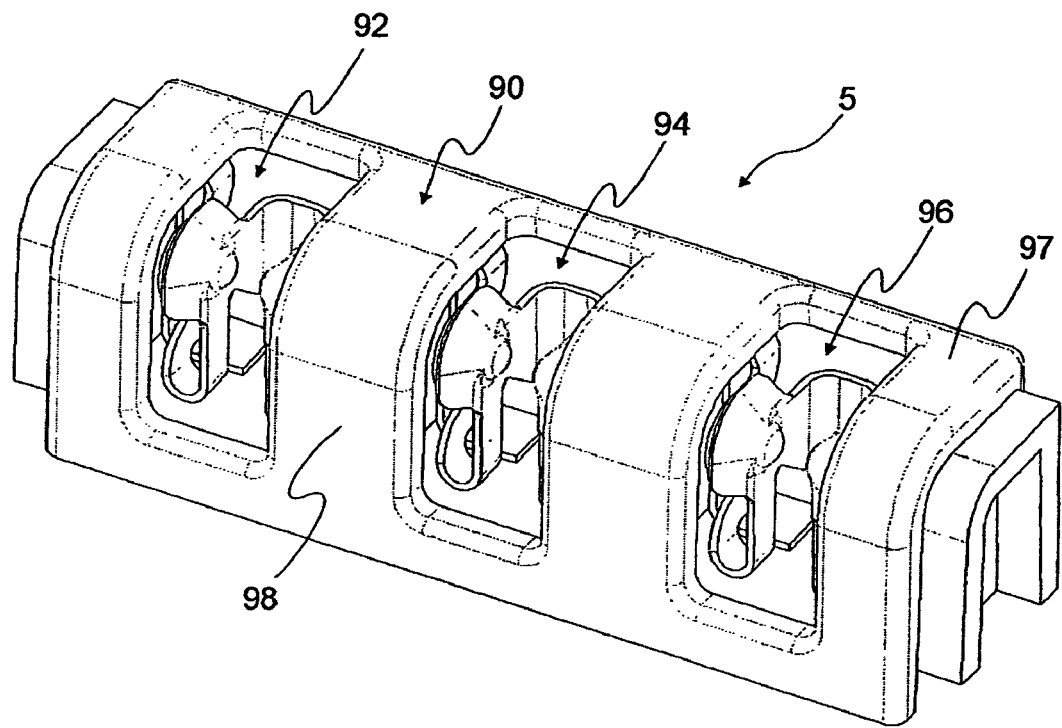
FIG. 6 is a front perspective view of the receptacle connector shown in FIG. 5 with the housing.

FIGS. 5 and 6 show a receptacle connector 5. The receptacle connector 5 comprises receptacle contacts 82, 84, 86, which have a similar structure as the receptacle contact 10 shown in FIGS. 1–4. Each of the receptacle contacts 82, 84, 86 has a contact surface soldered to a printed circuit board (not shown). A receptacle housing 90 comprising an upper wall 97 and a front wall 98 covers the receptacle contacts 82, 84, 86. The receptacle housing 90 includes elongated openings 92, 94, 96 formed on the upper wall 97 and the front wall 98 that extend parallel to the mating plane YZ and provide access to a contact member of each of the receptacle contacts 82, 84, 86.

Figure 7:
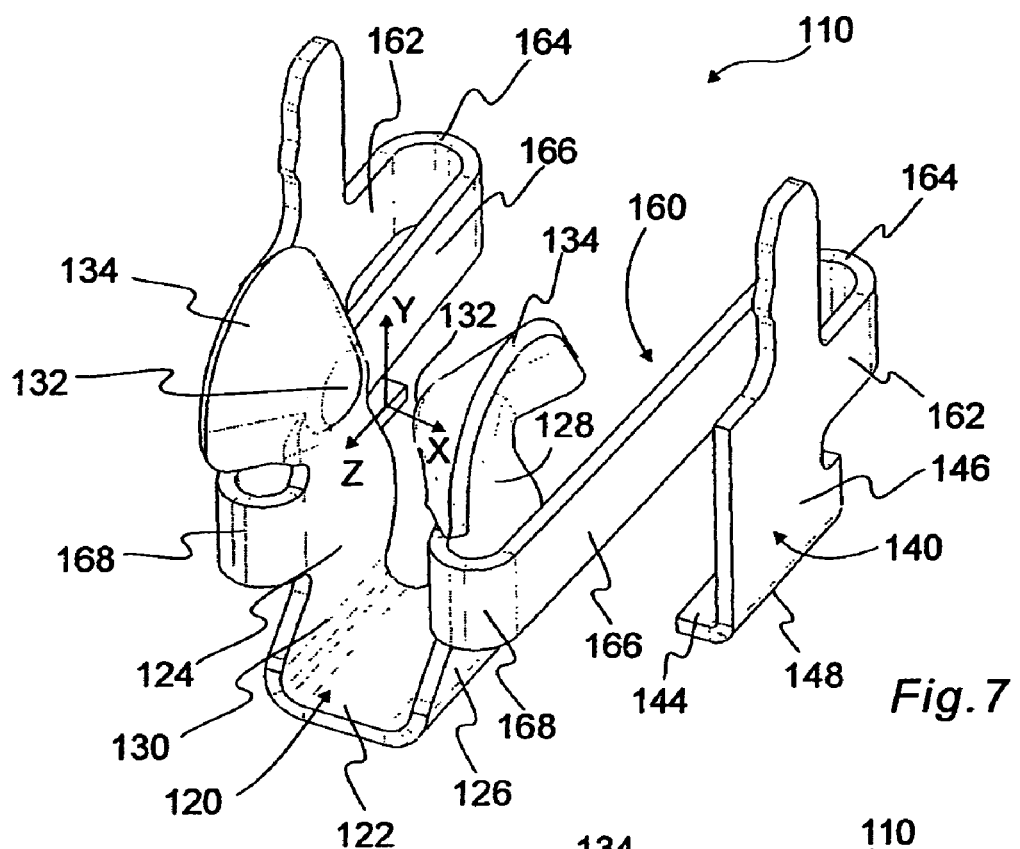
FIG. 7 is a rear perspective view of a receptacle contact according to a second embodiment of the invention.
Figure 8:
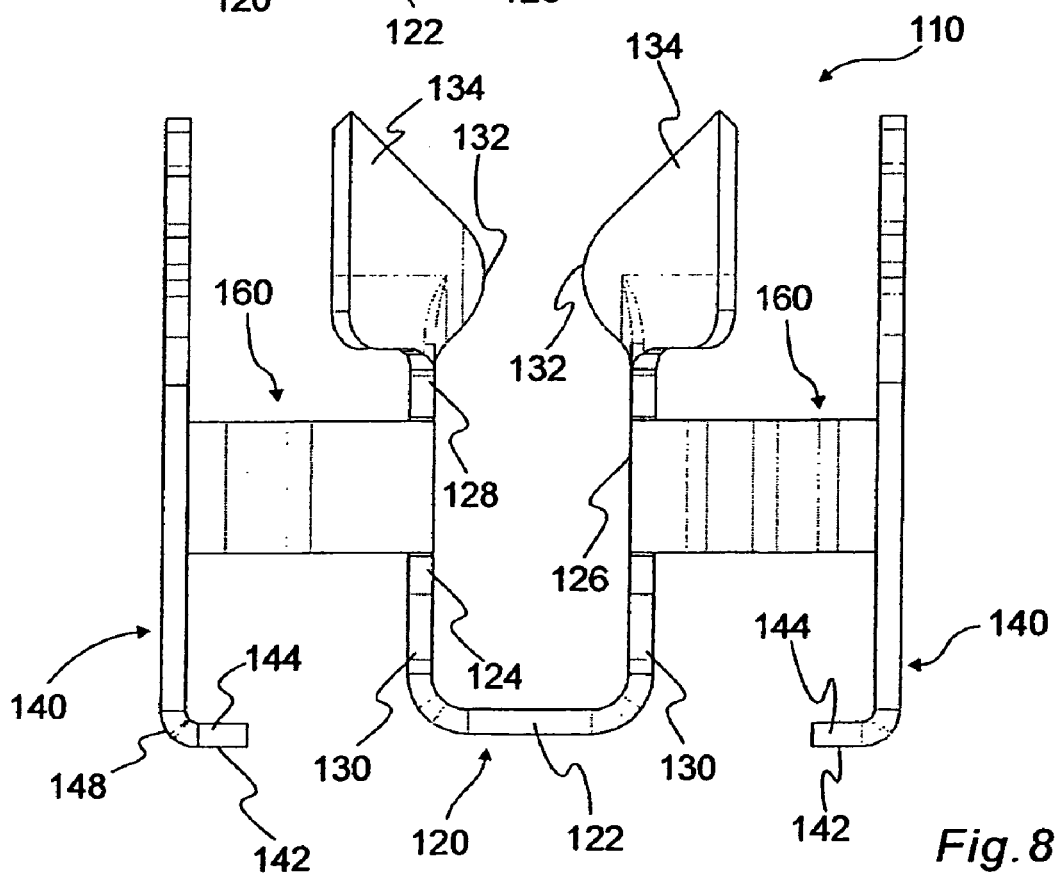
FIG. 8 is a front view of the receptacle contact shown in FIG. 7.
Figure 9:
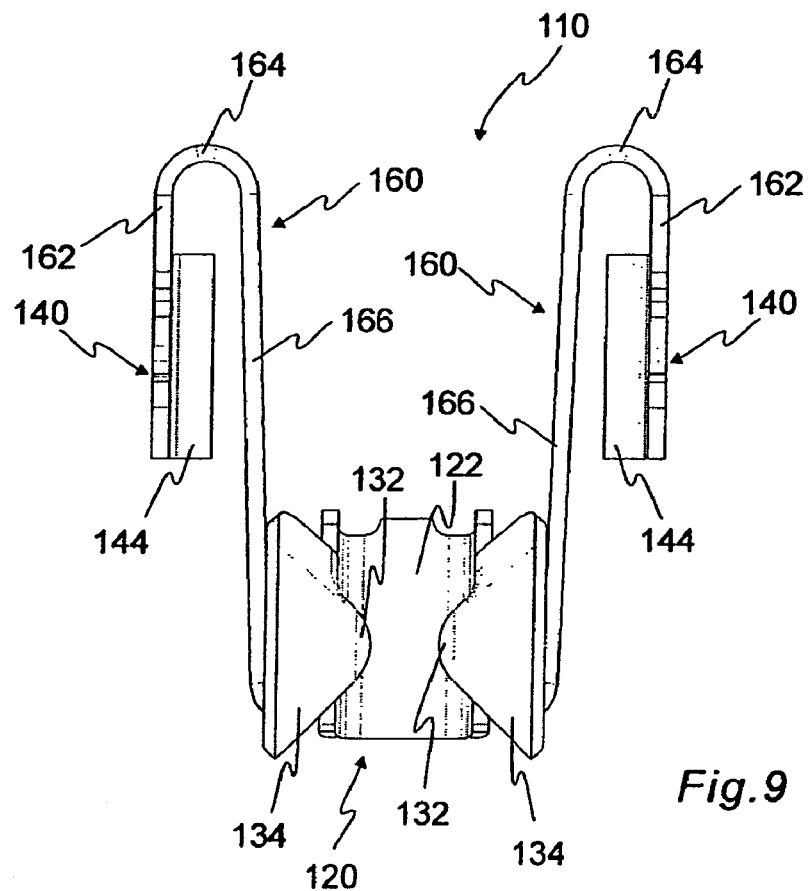
FIG. 9 is a rear view of the receptacle contact shown in FIG. 7.

A second embodiment of a receptacle contact 110 is shown in FIGS. 7–9. The receptacle contact 110 includes a contact member 120, a base member 140, and spring members 160. The receptacle contact 110 is substantially mirror-symmetrical with respect to the mating plane YZ. The base member 140 comprises a bottom portion 144 with a contact surface 142 and a lateral portion 146, which is upwardly bent along a bending edge 148. Each of the spring members 160, which extend substantially parallel to the contact surface 142 in the Z-direction, is integrally attached to a back edge of the base member 140. The spring members 160 comprise a first portion 162 and a second portion 166. The first and second portions 162, 166 are strip-like in form and are arranged in separate planes that run substantially coplanar with the mating plane YZ. The first and second portions 162, 166, however, may also be inclined with respect to the mating plane YZ, as shown in FIG. 9. The first portion 162 passes into the second portion 166 on a first bending edge 164 that extends substantially perpendicular to the contact surface 142. Each of the spring members 160 is bent along a second bending edge 168 so that the spring members 160 are substantially S-shaped.

At the second bending edges 168, the spring members 160 are integrally attached to the contact member 120 at an approximate middle of first and second legs 124, 126. The contact member 120 is substantially U-shaped, similar to the contact member 20 of the first embodiment, but extends in a vertical direction substantially perpendicular to the contact surface 142. The cross-sectional profile of the first and second legs 124, 126 is substantially broader than that of the spring members 160 to obtain a high spring constant. The first and second legs 124, 126 are connected with each other at fixed ends 130 by a connecting portion 122. At free or contact ends 128, each of the first and second legs 124, 126 comprises a contact point 132. The contact points 132 are partially surrounded by brim-like guide members 134. As shown in FIG. 8, the contact points 132 may be formed, for example, by inwardly directed protuberances formed at the contact ends 128. The receptacle contact 110 according to the second embodiment provides substantially the same functionality as the receptacle contact 10 of the first embodiment and therefore will not be described in greater detail herein.

Figure 11:
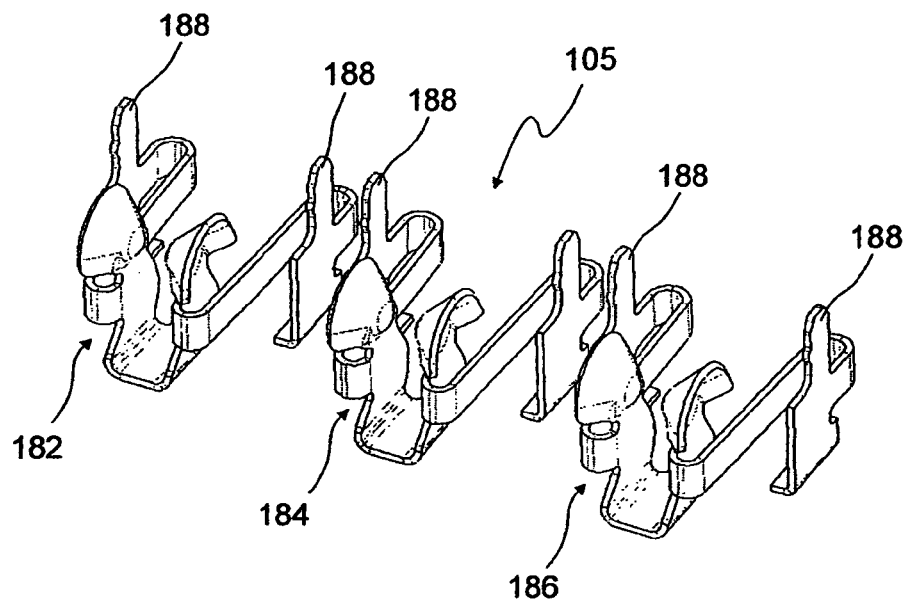
FIG. 11 is a front perspective view of a receptacle connector according to the second embodiment of the invention shown without a housing.
Figure 12:
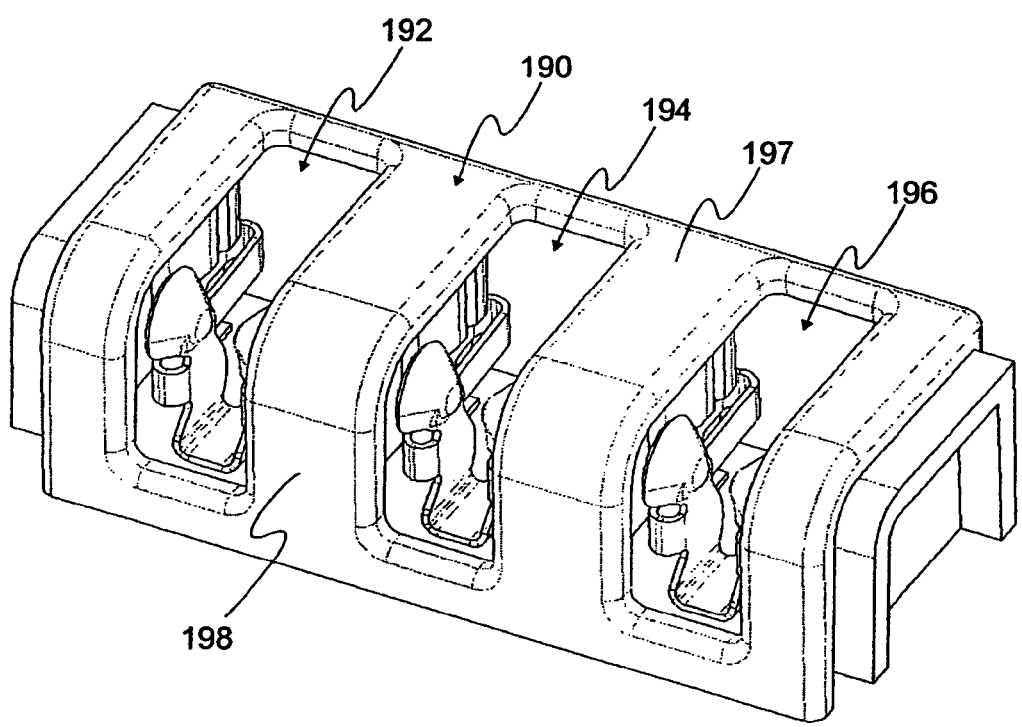
FIG. 12 is a front perspective view of the receptacle connector shown in FIG. 11 with the housing.

FIGS. 11 and 12 show a receptacle connector 105 comprising receptacle contacts 182, 184, 186, which have a similar structure as the receptacle contact 110 shown in FIGS. 7–9. The receptacle connector 105 comprises a receptacle housing 190 comprising an upper wall 197 and a front wall 198 that covers the receptacle contacts 182, 184, 186. The receptacle housing 190 includes elongated openings 192, 194, 196 formed on the upper and front walls 197, 198 that extend parallel to the mating direction YZ and provide access to the contact members 120 of the receptacle contacts 182, 184, 186. Each of the receptacle contacts 182, 184, 186 further includes alignment pins 188 for engaging with corresponding alignment slots (not shown) in the receptacle housing 190. The alignment pins 188 align and fix the receptacle contacts 182, 184, 186 within the receptacle housing 190.

Figure 10:
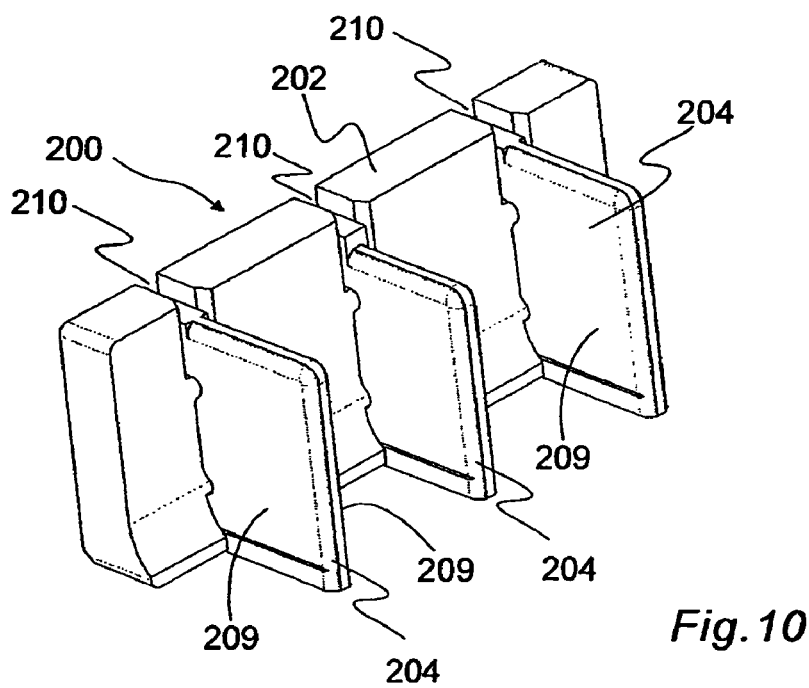
FIG. 10 is a front perspective view of a plug connector.
Figure 13:
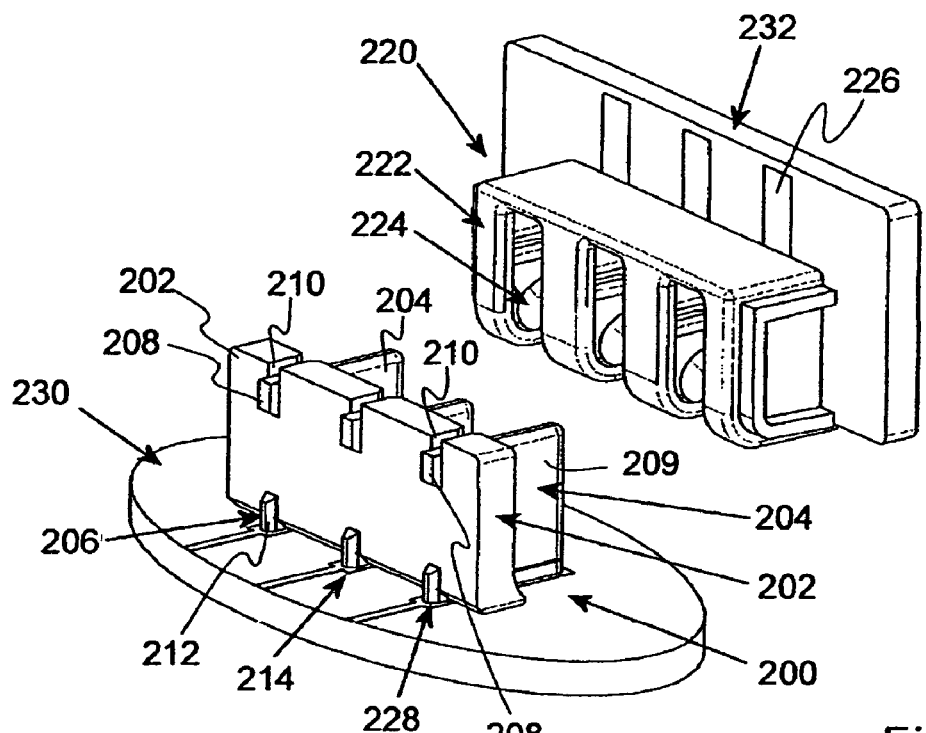
FIG. 13 is an exploded view of a connector assembly.
Figure 14:
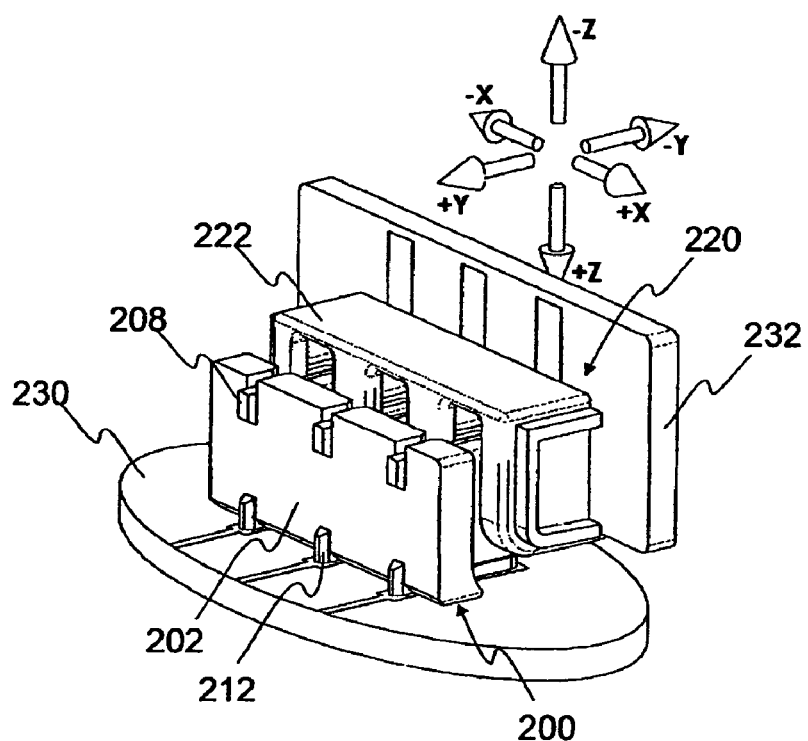
FIG. 14 is a perspective view of the connector assembly shown in FIG. 13.

FIGS. 10, 13, and 14 show a plug connector 200. The plug connector 200 corresponds to the receptacle connectors 5, 105 of the first and second embodiments. The plug connector 200 comprises a plug housing 202, plug contacts 204, and soldering legs 206, as shown in FIG. 13. The plug housing 202, which runs in a lateral direction, supports the plug contacts 204. Each of the plug contacts 204 has a plate-like shape and extends coplanar to the mating direction YZ. Each of the plug contacts 204 has a first extension 208, which passes through openings 210 arranged on an upper side of the plug housing 202, for fastening the plug contacts 204 to the plug housing 202. Soldering leg openings are provided on a bottom side of the plug housing 202 to accommodate second extensions 212 of the plug contacts 204. The second extensions 212 form the soldering legs 206.

The plug contacts 204 are soldered along their entire bottom narrow side or edge to form solder joints 228. This method securely fixes the plug contacts 204 to soldering pads 214 of a printed circuit board 230 and ensures optimal electrical contact therewith. The plug housing 202 is not directly attached to the printed circuit board 230 but stabilizes the plug contacts 204 in the lateral direction. As shown in FIG. 10, each of the plug contacts 204 comprises two parallel contact surfaces 209. Each of the contact surfaces 209 engages with one of the contact points 32, 132 upon mating.

As shown in FIGS. 13 and 14, the plug connector 200 is soldered on printed circuit board 232. Since the receptacle connector 220 shown in FIG. 14 is rotated approximately 90 degrees around the X-axis with respect to FIGS. 1 and 7, the Cartesian co-ordinate system shown in FIG. 14 is rotated accordingly.

Depending on which of the printed circuit boards 230, 232 shown in FIG. 14 is part of a mobile device or a removable electronic component, the plug connector 200 or the receptacle connector 220 is inserted into the respective other connector. Assuming that the plug connector 200 is soldered to the printed circuit board 230 of a mobile phone, and the receptacle connector 220 is soldered to soldering pads 226 of a battery pack, then the battery pack will be inserted into the mobile phone and the receptacle connector 220 is mated with the plug connector 200, for example, in the Z-direction. As shown in FIG. 14, the receptacle connector 220 can also be mated along the Y-axis, in a slanted direction, or by rotation around the X-axis.

In a final mating position, the receptacle housing 222 and the plug housing 202 are not in contact with each other. Further, the receptacle housing 222 does not touch the printed circuit board 230. Contact between the plug and receptacle connectors 200, 220 is only provided by the receptacle contacts 224 and the plug contacts 204. The plug contacts 204 do not engage with the connecting portion of the contact member 20, 120 of the receptacle contact 10, 110 so that the receptacle connector 220 is free to move with respect to the plug connector 200 in the YZ-plane. On the other hand, at maximum insertion depth, both the plug and receptacle housings 202, 222 may touch each other.

Misalignment between the plug and receptacle connectors 200, 220 upon mating is not critical since the guide members 34, 134 ensure that the plug contacts 204 will be centered. At the beginning of the mating process, even a small rotational misalignment around the Y-axis and the Z-axis is not critical. Typical tolerable rotational misalignments around the Y-axis and the Z-axis are +/−50. Around the X-axis, both the plug and receptacle connectors 200, 220 can be twisted or misaligned by even 90 degrees at the beginning of the mating process with respect to the final mating position shown in FIG. 14.

Figure 17:
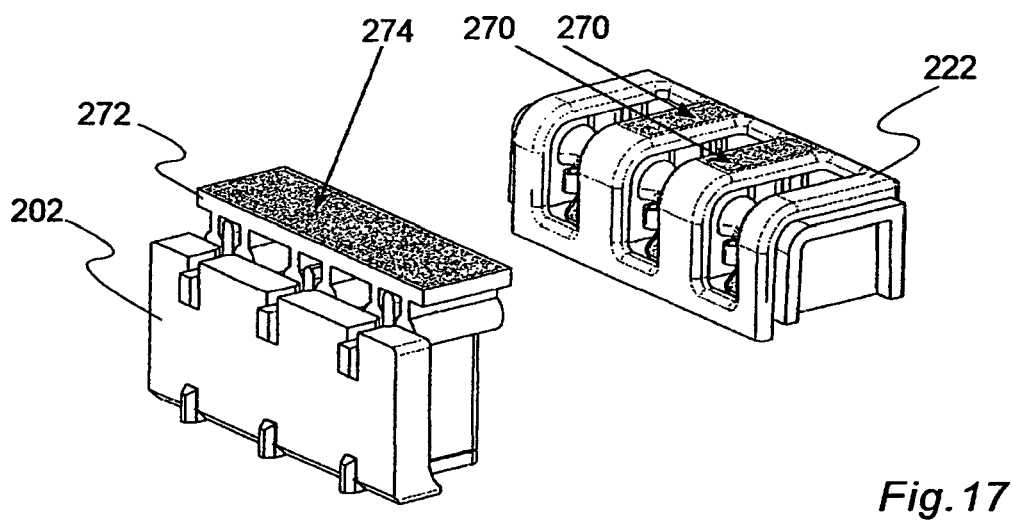
FIG. 17 is a schematic illustration showing the soldering of the receptacle connector and the plug connector to their respective printed circuit boards.
Figure 18:
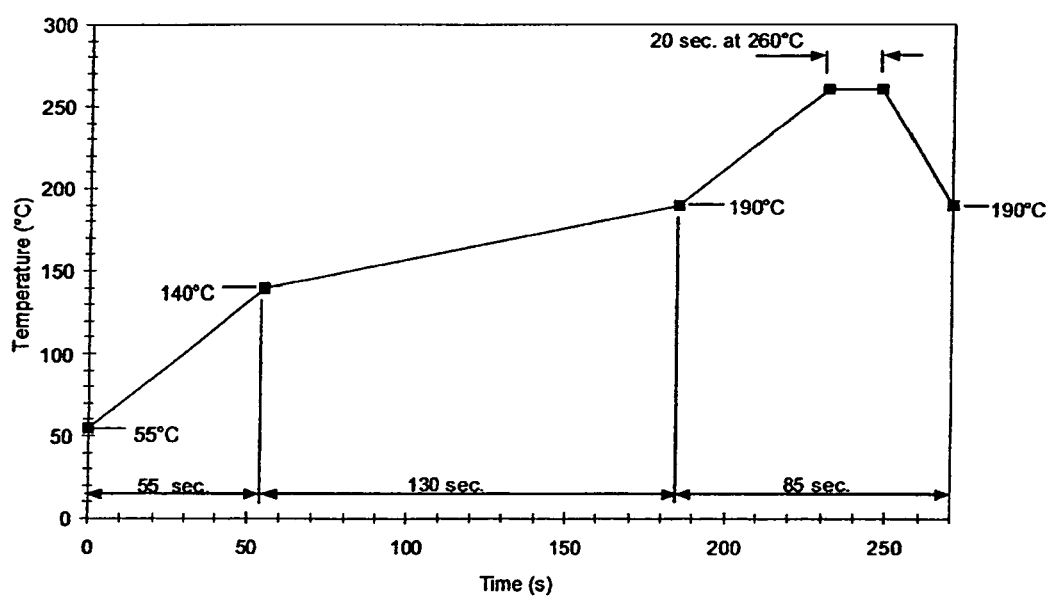
FIG. 18 is a graph of a temperature profile of a soldering process for soldering the receptacle connector and the plug connector to their respective printed circuit boards.

The receptacle connector 220 and the plug connector 200 are preferably soldered to their respective printed circuit boards 232, 230 by robotic pick-and-place. To this end, pick-and place surfaces 270 are provided on an upper wall of the receptacle housing 222, as shown in FIG. 17. Since the plug housing 202 typically does not provide a surface which is large enough to function as a pick-and-place surface, an auxiliary cap 272 is temporally snap fitted onto the plug contacts 204 to provide a pick-and-place surface 274. After soldering, the auxiliary cap 272 may be removed. An exemplary temperature profile of a soldering process is shown in FIG. 18. Preferably, heat is applied by hot air or infrared illumination.

FIGS. 15 and 16 show a connection between a battery pack 240 and a printed circuit board 242 of a mobile phone using a connector assembly comprising a receptacle connector 250 and a plug connector 260. The working range dY, dZ of a final mating position in the Y-direction and the Z-direction is indicated and depends on the specific needs of the respective mobile phones. The working range defines the maximum allowable displacement in the respective directions. In the Y-direction and the Z-direction, the contact points 32, 132 of the battery pack 240 simply slide along the contact surfaces 209 of the plug contacts 204 upon displacement, while in the X-direction, the contact members 20, 120 as a whole are resiliently displaced. Even a rotational displacement is ensured in the final mating position since each of the plug contacts 204 is only contacted point wise by two of the contact points 32, 132. Typical working range values in the X-direction, the Y-direction, and the Z-direction are less than +/−1 millimeter and around the X-axis, the Y-axis, and the Z-axis are +/−3 degrees.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

We claim:

1. A receptacle connector having at least one receptacle contact, the receptacle contact comprising:
   a contact member and spring members, the contact member being formed for receipt of a plug contact along a mating plane, at least one spring member being arranged on each side of the contact member, the contact member being resiliently displaceable toward the spring members in a direction substantial lateral to the mating plane by the spring members, the contact member being substantially U-shaped and including opposing contact points.

2. The receptacle connector of claim 1, wherein the contact points are arranged in the direction substantial lateral to the mating plane.

3. The receptacle connector of claim 1, wherein the contact member includes resilient first and second legs, the contact points being arranged on free ends of the first and second legs.

4. The receptacle connector of claim 1, wherein the contact member includes guide members arranged adjacent to the contact points for guiding the plug contact into the contact member, the guide members being angled with respect to the mating plane.

5. The receptacle connector of claim 3, wherein the first and second legs have a spring constant higher than the spring constant of the spring members.

6. The receptacle connector of claim 1, wherein the spring members have a substantially meander-shape.

7. The receptacle connector of claim 1, wherein the receptacle contact includes a base member that extends perpendicular to the mating plane that has a contact surface.

8. The receptacle connector of claim 1, wherein the spring members have a substantially strip-like shape.

9. The receptacle connector of claim 1, wherein the receptacle connector includes a receptacle housing with an elongated slot extending substantially parallel to the mating plane that provides access to the contact member.

10. The receptacle connector of claim 1, wherein the receptacle contact is substantially mirror-symmetrical.

* * * * *